(12) United States Patent
Wang et al.

(10) Patent No.: US 10,326,303 B2
(45) Date of Patent: Jun. 18, 2019

(54) TRANSFER SWITCH

(71) Applicant: Cummins Power Generation IP, Inc., Minneapolis, MN (US)

(72) Inventors: Yong Wang, Shanghai (CN); Fangwei Zheng, Shanghai (CN); Xuefeng Ji, Shanghai (CN); Dejun Cheng, Henan (CN); Yuxiang Wei, Shanghai (CN); Dongyan Chu, Jiangsu (CN)

(73) Assignee: Cummins Power Generation IP, Inc., Minneapolis, MN (US)

( * ) Notice: Subject to any disclaimer, the term of this patent is extended or adjusted under 35 U.S.C. 154(b) by 0 days.

(21) Appl. No.: 15/849,190

(22) Filed: Dec. 20, 2017

(65) Prior Publication Data
US 2018/0183263 A1    Jun. 28, 2018

Related U.S. Application Data

(63) Continuation of application No. 14/370,649, filed as application No. PCT/CN2012/070519 on Jan. 18, 2012.

(51) Int. Cl.
| | | |
|---|---|---|
| *H02J 9/06* | (2006.01) | |
| *H01H 47/16* | (2006.01) | |
| *H02J 9/08* | (2006.01) | |
| *H01H 50/44* | (2006.01) | |

(52) U.S. Cl.
CPC ............ *H02J 9/061* (2013.01); *H01H 47/16* (2013.01); *H02J 9/08* (2013.01); *H01H 50/44* (2013.01); *H01H 2300/018* (2013.01); *Y10T 307/858* (2015.04)

(58) Field of Classification Search
CPC .. H01H 47/16; H01H 2300/018; H01H 50/44; H02J 9/061; H02J 9/08; Y10T 307/858
USPC .......................................................... 323/255
See application file for complete search history.

(56) References Cited

U.S. PATENT DOCUMENTS

| | | | | |
|---|---|---|---|---|
| 5,136,233 A | * | 8/1992 | Klinkenberg | G05F 1/20 323/255 |
| 5,726,561 A | * | 3/1998 | Ghosh | H02J 3/24 323/255 |
| 6,472,851 B2 | * | 10/2002 | Hammond | G05F 1/147 323/258 |

(Continued)

FOREIGN PATENT DOCUMENTS

| | | |
|---|---|---|
| CN | 25552233 | 5/2003 |
| CN | 2874898 | 2/2007 |

(Continued)

OTHER PUBLICATIONS

International Search Report and Written Opinion for PCT/CN2012/070519, dated Nov. 15, 2012.

(Continued)

*Primary Examiner* — Rexford N Barnie
*Assistant Examiner* — Elim Ortiz
(74) *Attorney, Agent, or Firm* — Foley & Lardner LLP

(57) ABSTRACT

A transfer switch transfers electric power provided to an electrical load from a first power source to a second power source. The transfer switch includes a coil arrangement that controls movement of a member to open or close a contactor of the first or second power source. The coil arrangement may be used with two voltage levels.

35 Claims, 5 Drawing Sheets

(56) References Cited

U.S. PATENT DOCUMENTS

| | | |
|---|---|---|
| 2003/0197431 A1 | 10/2003 | Lathrop et al. |
| 2006/0028069 A1 | 2/2006 | Loucks et al. |
| 2008/0179958 A1 | 7/2008 | Lathrop et al. |
| 2011/0043307 A1 | 2/2011 | Gonzales et al. |
| 2012/0090966 A1* | 4/2012 | Lathrop .................. H02J 9/061 200/43.01 |

FOREIGN PATENT DOCUMENTS

| | | |
|---|---|---|
| CN | 201708581 | 1/2011 |
| CN | 202772655 | 3/2013 |
| JP | 2010-051098 | 3/2010 |

OTHER PUBLICATIONS

English Translation of Notice of Grant for Chinese Patent Application No. 201280067257.8, dated Mar. 3, 2017, 2 pages.
English Translation of Second Office Action for Chinese Patent Application No. 201280067257.8, dated Aug. 12, 2016, 3 pages.

* cited by examiner

TRANSFER SWITCH

CROSS-REFERENCE TO RELATED APPLICATIONS

This application is a continuation of U.S. application Ser. No. 14/370,649, filed Dec. 2, 2014, which is a national stage filing of, and claims the benefit of priority to, International Application No. PCT/CN2012/070519, filed on Jan. 18, 2012, both of which are hereby incorporated by reference in their entireties.

BACKGROUND

The present invention generally relates to electrical power systems, and more particularly, but not exclusively, relates to switching between different electrical power sources.

Electrical power is provided to various loads in commercial and residential buildings from an electrical grid such as a public utility. In some instances, a backup generator or another public utility may be provided to supply power to the loads if there is an interruption in power from the utility. Typically, a transfer switch will detect the interruption in power from the grid and start the generator. The transfer switch will switch from the electrical grid to the generator for delivering power to the loads.

The operating voltage of the electrical grid may vary from country-to-country. For each different operating voltage, the transfer switch must be reconfigured to accommodate the particular operating voltage. Reconfiguring the components of the transfer switch can be time-consuming and expensive. Indeed, there is an ongoing demand for further contributions in this area of technology. Accordingly, there remains a need for further contributions in this area of technology.

SUMMARY OF THE INVENTION

One embodiment of the present invention is a unique transfer switch. Other embodiments include apparatuses, systems, devices, hardware, methods, and combinations for a transfer switch. Further embodiments, forms, features, aspects, benefits, and advantages of the present application shall become apparent from the description and figures provided herewith.

BRIEF DESCRIPTION OF THE DRAWINGS

The description herein makes reference to the accompanying figures wherein like reference numerals refer to like parts throughout the several views, and wherein.

DETAILED DESCRIPTION OF THE INVENTION

Figure 1:
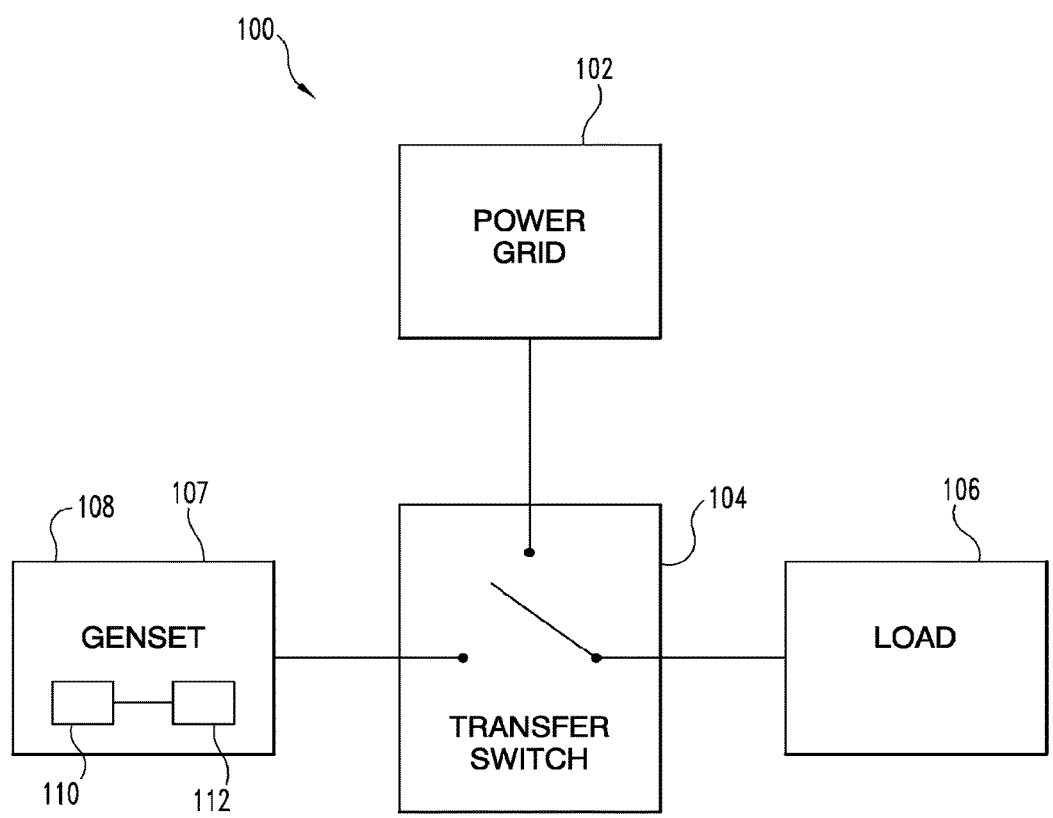
FIG. 1 is a schematic diagram of an electrical power system 100.

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

FIG. 1 is a schematic diagram of an electrical power system 100. The power system 100 includes an electrical power grid 102 such as a public utility. The power system 100 also includes a transfer switch 104 that is electrically coupled to and receives power from the power grid 102. The transfer switch 104 is electrically coupled to one or more loads 106 to provide power to the loads 106. Typically, the transfer switch 104 is located in or near the building, vehicle, or other location where the loads 106 are located.

The power system 100 further includes another power source 107, such as genset 108, that is electrically coupled to the transfer switch 104 to supply backup power to the loads 106. It is contemplated that the other power source 107 may be an electrical grid from a public utility. The genset 108 includes a generator 110 driven by an internal combustion engine 112. The generator 110 may be any type of generator including, but not limited to, an AC generator such as permanent magnet alternator. The internal combustion engine 112 may be any type of engine including diesel, gasoline, natural gas, gas turbine, microturbine, or any other type of engine or power plant. It is contemplated that other power generation systems may be used in combination with or in place of the power grid 102 and/or the genset 108 such as power from solar, geothermal, wind, and/or tidal energy. Furthermore, it is contemplated that other types of energy, such as wind or tidal energy, may be used in combination with or in place of the engine 112 to drive the generator 110.

Figure 2:
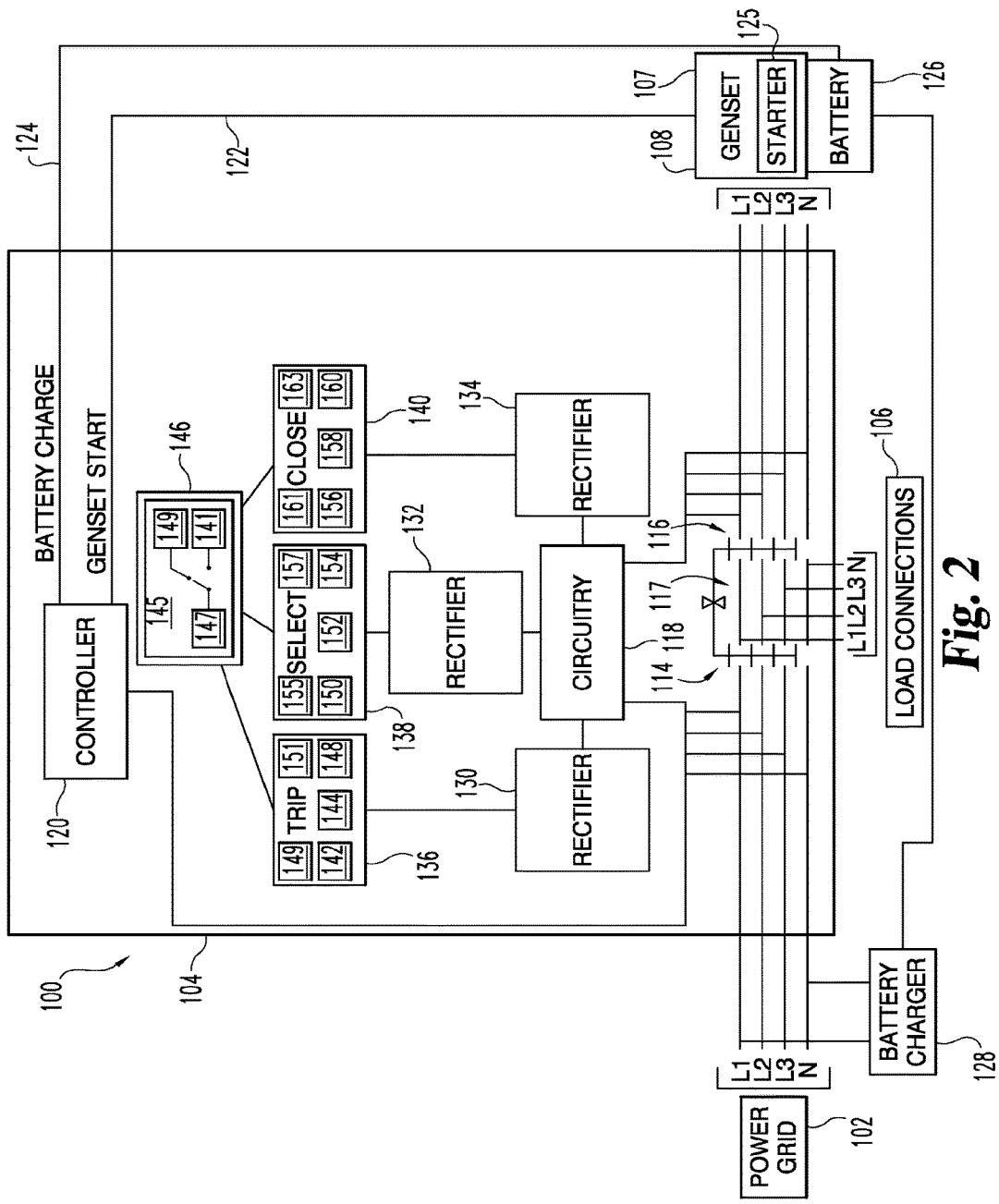
FIG. 2 is a schematic diagram of a transfer switch 104.

FIG. 2 is a schematic diagram of the transfer switch 104. Although the FIG. 2 illustrates various components of switch 104 in boxes, it is contemplated that the components may be combined or arranged differently from that shown; thus, the particular arrangement shown FIG. 2 should not be construed as limiting. The power grid 102 provides three-phase AC power (shown as L1, L2, L3) to the transfer switch 104 through a normally closed contactor 114. When the genset 108 is operating, the genset 108 provides three-phase AC power (shown as L1, L2, L3) to the transfer switch 104 through a normally open contactor 116. In other embodiments, the power provided by the power grid 102 and/or the genset 108 is DC power. FIG. 2 shows that the power grid 102 and the genset 108 provide a neutral line N. However, other configurations are contemplated, for example, in which the neutral line N is not switched by the contactors 114, 116 or the neutral line N is provided at the transfer switch 104. The transfer switch 104 includes an output 117 to provide power to the loads 106.

The transfer switch 104 includes circuitry 118 for processing signals, such as, one or more lines L1, L2, L3 from power grid 102 and/or the genset 108, or signals to and from a controller 120. For example, the circuitry 118 may provide logic for different functions in the transfer switch 104 and/or signal processing. The circuitry 118 may be a single component, or a collection of operatively coupled components; and may be comprised of digital circuitry, analog circuitry, or a hybrid combination of both of these types.

The controller 120 monitors the power from the power grid 102 for any interruptions. If there is an interruption, the controller 120 transmits a signal 122 to start the genset 108 using battery 126. In one aspect, the engine 112 includes a starter 125 that is powered by the battery 126 to start the engine. The controller 120 may send a signal 124 for charging the battery 126. A battery charger 128 may be electrically coupled to one or more lines L1, L2, L3, N from the power grid 102, which may be rectified, to provide power to the battery 126 as controlled by the controller 120.

After the circuitry 118 performs its functions, signals are passed to one or more rectifiers 130, 132, and 134 to convert the AC voltage to a DC voltage. The DC voltage from the rectifiers 130, 132, 134 is then provided to one or more electromagnetic devices 136, 138, and 140. Each of the electromagnetic devices 136, 138, 140 is responsive to a predefined AC power voltage change.

The electromagnetic device 136 may be a trip solenoid or any other suitable electromagnetic device as known to those skilled in the art. The electromagnetic device 136 includes a coil 142 and a coil 144. A selector 146 is electrically coupled to both coils 142 and 144. The selector 146 allows an operating voltage to be selected for use in the transfer switch 104. The selector 146 may be any type of selector that allows selection of an operating voltage such as a switch, direct rewiring of the coils 142, 144, a terminal block, jumpers, an electrical switch, or an automatic voltage detection and selection circuit.

In one aspect of the present application, the selector 146 may be a switch 145 which includes an input pole 147 electrically coupled (not shown) to the contactor 114 to receive an input representative of electricity from the power grid 102. It is contemplated that the input pole 147 may also be electrically coupled to the contactor 116 to receive an input representative of electricity from the power source 107 such as genset 108. The selector 146 may further include an output 149 electrically coupled (not shown) to one or more of the coils 142, 150, 156 to place the operating voltage across one or more of the coils 142, 150, 156 if the switch 145 is in a first state electrically connecting the input pole 147 to the output 149. Furthermore, the selector 146 may include an output 141 electrically coupled (not shown) to the one or more of the coils 144, 152, 158 to place the operating voltage across the coils 144, 152, 158 if the switch 145 is in a second state electrically connecting the input pole 147 to the output 141.

Furthermore, it is contemplated that one selector 146 may be connected to each of the electromagnetic devices 136, 138, 140 or three selectors may be used such that each of the electromagnetic devices 136, 138, 140 includes its own corresponding selector.

The selector 146 provides an operating voltage across the coil 142 if one AC power voltage level is selected and the coil 144 if a different AC power voltage level is selected. As discussed below, the coils 142 and 144 may be one coil that is center-tapped or two coils that are connected in series or in parallel. A moveable contactor actuation member 148 is provided so that the switch 145 is responsive to a change in a magnetic field induced by the coil 142 and/or the coil 144 to break an electric circuit, i.e. to open the normally closed contactor 114. In one embodiment, the electromagnetic device 136 includes a solenoid 149 in which the moveable contactor actuation member 148 is an armature 151 of the solenoid 149, and the coil 142 and the coil 144 are solenoid windings structured to induce approximately like magnetic fields when energized with a respective one of a first AC power voltage level and a second AC power voltage level.

The electromagnetic device 138 may be a select solenoid or any other suitable electromagnetic device as known to those skilled in the art. The electromagnetic device 138 includes a coil 150 and a coil 152. The selector 146 is electrically coupled to both coils 150 and 152. The selector 146 provides an operating voltage across the coil 150 if one AC power voltage level is selected and the coil 152 if a different AC power voltage level is selected. As discussed below, the coils 150 and 152 may be one coil that is center-tapped or two coils that are connected in series or in parallel. A moveable contactor actuation member 154 is provided so that the switch 145 is responsive to a change in a magnetic field induced by the coil 150 and/or the coil 152 to select one or more gensets 108 to be started and/or starts the genset 108 in conjunction with the controller 120. In one embodiment, the electromagnetic device 138 includes a solenoid 155 in which the moveable contactor actuation member 154 is an armature 157 of the solenoid 155, and the coil 150 and the coil 152 are solenoid windings structured to induce approximately like magnetic fields when energized with a respective one of a first AC power voltage level and a second AC power voltage level.

The electromagnetic device 140 may be a close solenoid or any other suitable electromagnetic device as known to those skilled in the art. The electromagnetic device 140 includes a coil 156 and a coil 158. The selector 146 is electrically coupled to both coils 156 and 158. The selector 146 provides an operating voltage across the coil 156 if one AC power voltage level is selected and the coil 158 if a different AC power voltage level is selected. As discussed below, the coils 156 and 158 may be one coil that is center-tapped or two coils that are connected in series or in parallel. A moveable member 160 is provided so that the switch 145 is responsive to a change in a magnetic field induced by the coil 156 and/or the coil 158 to make an electric circuit, i.e. to close the normally open contactor 116. In one embodiment, the electromagnetic device 140 includes a solenoid 161 in which the moveable contactor actuation member 160 is an armature 163 of the solenoid 161, and the coil 156 and the coil 158 are solenoid windings structured to induce approximately like magnetic fields when energized with a respective one of a first AC power voltage level and a second AC power voltage level.

Figure 3:
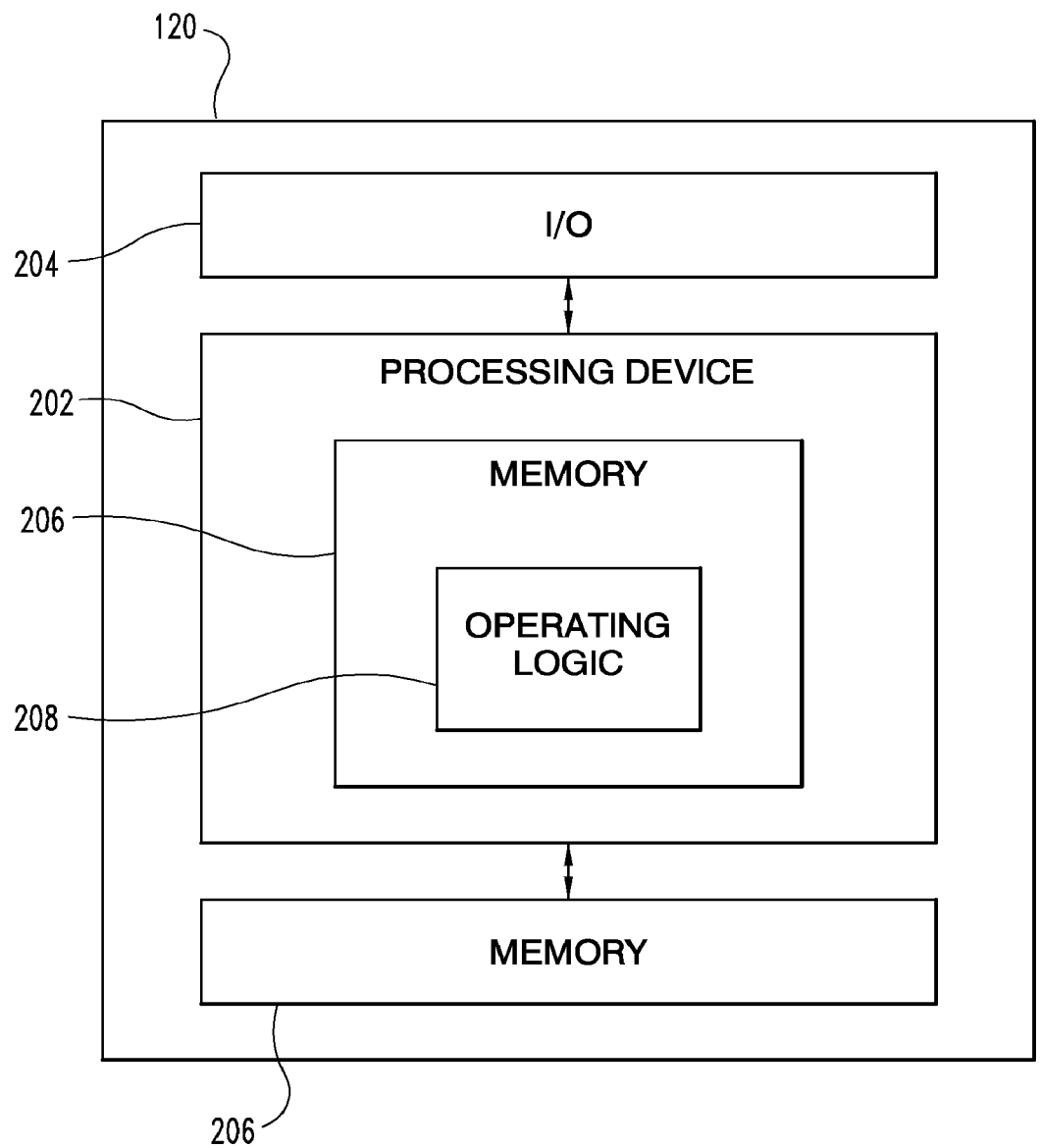
FIG. 3 is a schematic diagram of a controller 120.

FIG. 3 is a schematic diagram of a controller 120. Controller 120 includes a processing device 202, input/output ports 204, memory 206, and operating logic 208. Furthermore, controller 120 communicates with one or more external devices. The input/output ports 204 may be any type of ports that allow the controller 120 to communicate with the external devices. For example, the input/output ports 204 may be comprised of hardware, software, and/or firmware.

The external device may be any type of device that allows signals to be inputted or outputted from the controller 120. For example, the external device may be another controller, circuitry 118, power from lines L1, L2, L3, battery 126, rectifiers 130, 132, 134, electromagnetic devices 136, 138, 140, selector 146, battery charger 128, genset 108, a computer, a printer, a display, an alarm, an illuminated indicator, a keyboard, a mouse, and/or a touch screen display. It is further contemplated that there may be more than one external device in communication with the controller 120.

Processing device 202 can be of a programmable type, a dedicated, hardwired state machine, or a combination of these; and can further include multiple processors, Arithmetic-Logic Units (ALUs), Central Processing Units (CPUs), or the like. For forms of processing device 202 with multiple processing units, distributed, pipelined, and/or parallel processing can be utilized as appropriate. Processing device 202 may be dedicated to performance of just the operations described herein or may be utilized in one or more additional applications. In the depicted form, processing device 202 is of a programmable variety that executes algorithms and processes data in accordance with operating logic 208 as defined by programming instructions (such as software or firmware) stored in memory 206. Alternatively or additionally, operating logic 208 for processing device 202 is at least partially defined by hardwired logic or other hardware. Processing device 202 can be comprised of one or more components of any type suitable to process the signals received from input/output ports 204 or elsewhere, and provide desired output signals. Such components may include digital circuitry, analog circuitry, or a combination of both.

Memory 206 may be of one or more types, such as a solid-state variety, electromagnetic variety, optical variety, or a combination of these forms. Furthermore, memory 206 can be volatile, nonvolatile, or a mixture of these types, and some or all of memory 206 can be of a portable variety, such as a disk, tape, memory stick, cartridge, or the like. In addition, memory 206 can store data that is manipulated by the operating logic 208 of processing device 202, such as data representative of signals received from and/or sent to input/output device 204 in addition to or in lieu of storing programming instructions defining operating logic 208, just to name one example. As shown in FIG. 3, memory 206 may be included with processing device 202 and/or coupled to the processing device 202.

Figure 4:
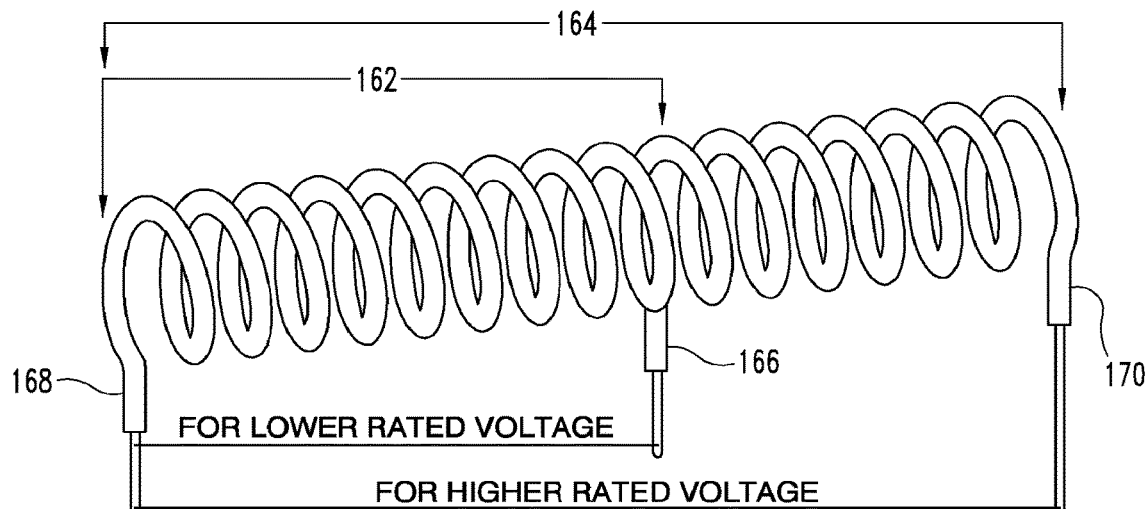
FIG. 4 is an illustration of one embodiment of coils 162 and 164.

FIG. 4 illustrates one embodiment of a coil 162 and a coil 164. The coil 162 is a subset of the coil 164 with a terminal 166 located in between terminals 168, 170. When the operating voltage of the transfer switch 104 is relatively lower, for example 110 VAC, the coil 162 will be selected by the selector 146. Conversely, when the operating voltage of the transfer switch 104 is relatively higher, for example 220 VAC, the coil 164 will be selected by the selector 146. As one example, the coil 162 may be used for coils 142, 150, 156 and the coil 164 may be used for coils 144, 152, 158. The number of loops in the coils 162, 164 and the location of the terminal 166 will vary based on the operating voltages of the transfer switch 104. In addition, it is contemplated that more than one terminal 166 may be used such that more than two voltages may be utilized. Furthermore, it is contemplated that the coil 164 includes several turns, and the coil 162 is a portion of the coil 164 being defined by a subset of the turns of the coil 164. In one aspect of the present application, neither the coil 162 and the coil 164 is included in an electrical circuit of the other when the first AC power voltage level or the second AC power voltage level is selected, respectively, with the selector 146.

Figure 5:
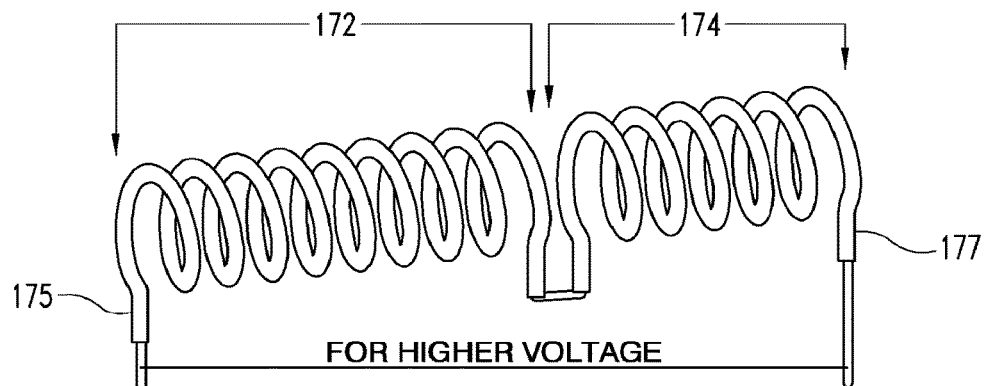
FIG. 5 is an illustration of another embodiment of coils 172 and 174.
Figure 6:
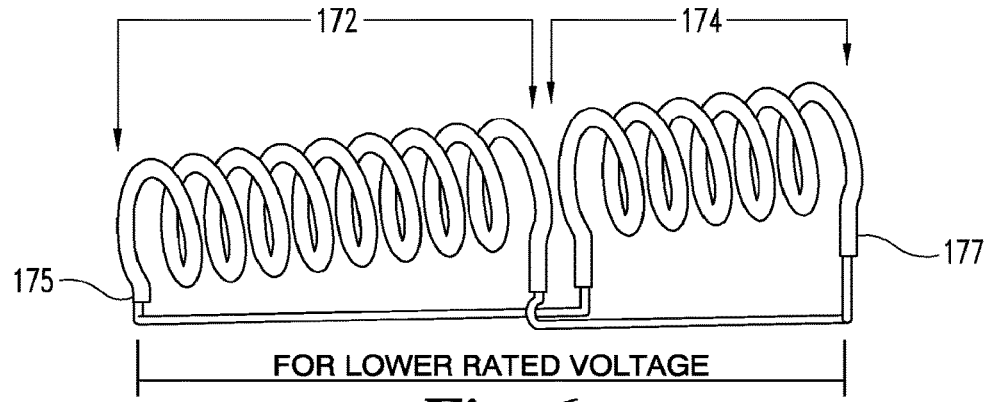
FIG. 6 is an illustration of another embodiment of coils 172 and 174.

FIGS. 5 and 6 illustrates an embodiment in which two coils 172, 174 may be connected in series or in parallel, respectively. Moreover, the terminals 175 and 177 may be used to apply a current through the coils. In FIG. 5, the coil 172 and the coil 174 are two separate coils connected in series by a conductor 176. When the operating voltage of the transfer switch 104 is relatively higher, for example 220 VAC, selector 146 will place the coils 172, 174 in series as seen in FIG. 5. When the operating voltage of the transfer switch 104 is relatively lower, for example 110 VAC, selector 146 will place the coils 172, 174 in parallel as seen in FIG. 6. The number of loops in the coils 172, 174 and the location of the conductor 176 will vary based on the operating voltages of the transfer switch 104. In addition, it is contemplated that more than two coils may be configured in series or in parallel such that more than two voltages may be utilized.

Figure 7:
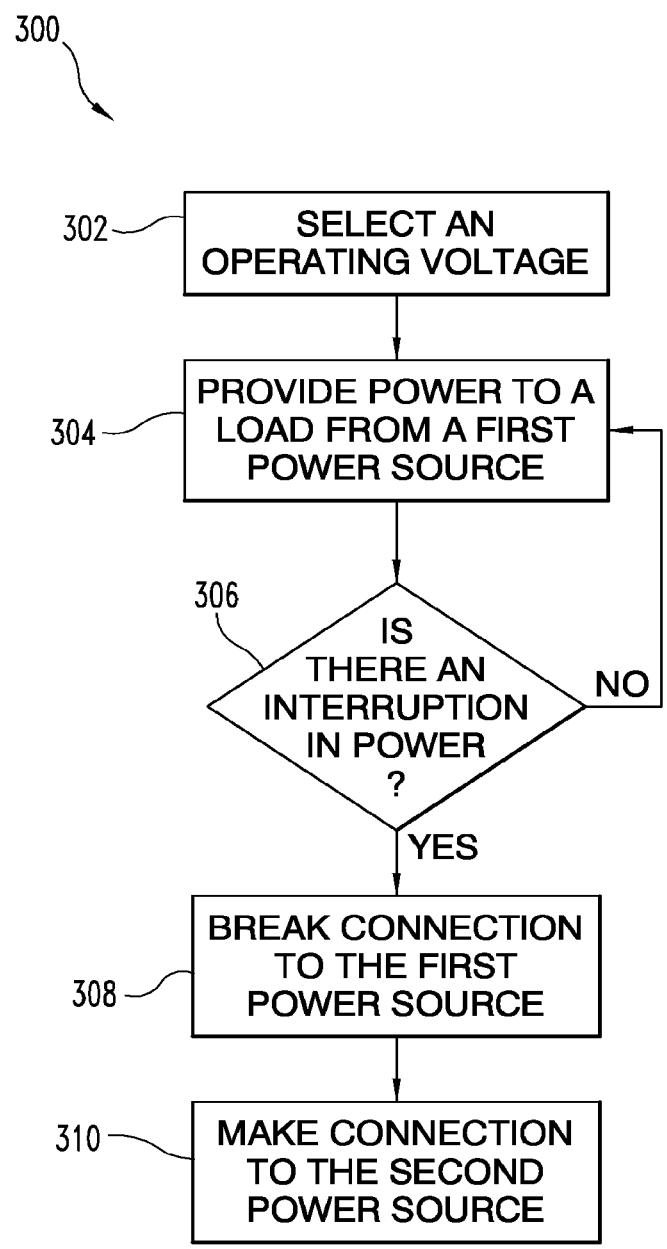
FIG. 7 is a schematic flow diagram of a technique 300.

FIG. 7 illustrates a schematic flow diagram 300 for transferring electric power that is provided to an electrical load from one power source to another power source. Operations illustrated are understood to be examples only, and operations may be combined or divided, and added or removed, as well as re-ordered in whole or in part, unless explicitly stated to the contrary. In operation 302, the operating voltage is selected using the selector 146. Depending on whether there is one coil or two separate coils and based on the voltage level, one of the configurations shown in FIGS. 4-6 will be used. The voltage level may be selected automatically by a combination of software or hardware, or be set using mechanical switch, direct rewiring of the coils 142, 144, a terminal block, jumpers, an electrical switch, or an automatic voltage detection and selection circuit.

In operation 304, the transfer switch 104 provides power to the loads 106 from a first power source such as the power grid 102. In operation 306, the transfer switch 104 monitors whether there is an interruption in power from the first power source. If there is no interruption, power continues to be provided to the loads 106 from the power grid 102 through the transfer switch 104. If there is an interruption, the technique proceeds to the next operation 308.

In operation 308, the electromagnetic device 136 opens the normally closed contactor 114. The electromagnetic device 138 selects and/or starts the genset 108 in conjunction with the controller 120. The genset 108 may be started before, at the same time, or after the normally closed contactor 114 is opened. In operation 310, the electromagnetic device 140 closes the normally open contactor 116 in order to provide power to the loads 106 from the second power source such as the genset 108. The circuitry 118 and/or the controller 120 may control the timing of the electrical connection of the generator 110 to the load to allow the engine 112 to reach a desired speed.

Although the above description generally relates to a break-before-make scheme for the operation of the transfer switch 104, other operational schemes are contemplated such as a make-before-break scheme in which the normally open contactor 116 is closed before the normally closed contactor 114 is opened such that the genset 108 is providing power to the loads 106 before the power grid 102 is disconnected from the circuit. A make-before-break scheme may be desirable in certain applications such as hospitals.

Furthermore, the present application, including the transfer switch 104, may be used anytime power is switched from one power source to another power source and is limited to situations involving a power interruption or an emergency power situation.

One aspect of the present application includes an apparatus, comprising: a transfer switch to transfer AC electric power provided to an electrical load from a first source to a second source, the transfer switch including: an output to provide the AC electric power to the load; a first contactor to selectively provide the AC electric power to the load from the first source; a second contactor to selectively provide the AC electric power to the load from the second source; an electromagnetic contactor actuation arrangement responsive to a predefined electric power change from the first source to change state of one or more of the first contactor and the second contactor, the arrangement including: a first electric coil; a second electric coil; a selector electrically coupled to the first coil and the second coil to provide an operating voltage across the first coil if the first AC power voltage level is selected and the second coil if the second AC power voltage level is selected; and a moveable contactor actuation member responsive to a magnetic field change to make or break a contactor-formed electric circuit, the first coil generating the magnetic field change if the AC electric power provided to the load is at the first AC power voltage level, and the second coil generating the magnetic field change if the AC electric power provided to the load is at the second AC power voltage level.

Optional features of this aspect may include: wherein the second coil includes several turns, and the first coil is a portion of the second coil being defined by a subset of the turns of the second coil; wherein the first coil includes a first number of turns, the second coil includes a second number of turns different than the first number of turns, and neither one of the first coil and the second coil is included in an electrical circuit of another when the first AC power voltage level or the second AC power voltage level is selected with the selector; wherein the contactor actuation arrangement includes a solenoid, the moveable contactor actuation member is an armature of the solenoid, and the first coil and the second coil are solenoid windings structured to induce approximately like magnetic fields when energized with a respective one of the first AC power voltage level and the second AC power voltage level; wherein the selector includes an electrical switch, the electrical switch including: an input pole electrically coupled to the first contactor to receive an input representative of electricity from the first source, a first output electrically coupled to the first coil to place the operating voltage across the first coil if the switch is in a first state electrically connecting the input pole to the first output, and a second output electrically coupled to the second coil to place the operating voltage across the second coil if the switch is in a second state electrically connecting the input pole to the second output; wherein the transfer switch includes rectifier circuitry electrically coupled to the contactor actuation arrangement; a public electric utility grid input to the first contactor with the grid to serve as the first source; an electric power generator driven by an internal combustion engine to serve as the second source, the engine including a starter powered by a battery; and wherein the transfer switch includes battery charging circuitry to maintain charge of the battery, the transfer switch is structured to transfer a three phase form of the AC electric power, and the transfer switch further comprises: means for directing the engine to start if a transfer of the load from the grid to the generator is initiated, means for breaking electrical contact of the load with the grid before making electrical contact between the load and the generator, means for timing the electrical connection of the generator to the load to allow the engine to reach a desired speed, and, the first AC power voltage level corresponds to 110 VAC and the second AC power voltage level corresponds to 220 VAC; wherein the contactor actuation arrangement includes: a first electromagnetic actuator structured to change state of the first contactor, the first electromagnetic actuator including the moveable contactor actuation member, and the first coil and the second coil; a second electromagnetic actuator structured to change state of the second contactor, the second electromagnetic actuator includes a third coil and a fourth coil and another moveable actuation member magnetically responsive to the third coil and the fourth coil, and the selector is electrically connected to provide the first AC power voltage level across the third coil if the first AC power voltage level is selected and to place the second AC power voltage level across the fourth coil if the second AC power voltage level is selected; wherein the transfer switch includes a third contactor, the actuation arrangement includes a third electromagnetic actuator structured to change state of the third contactor, the third electromagnetic actuator includes a fifth coil, a sixth coil, and a further moveable actuator member magnetically responsive to the fifth coil and the sixth coil, and the selector is electrically connected to provide the first AC power voltage level across the fifth coil if the first AC power voltage level is selected and to place the second AC power voltage level across the sixth coil if the second AC power voltage level is selected.

Another aspect of the present application includes an apparatus, comprising: a transfer switch to transfer AC electric power provided to an electrical load from a first AC power source to a second AC power source, the transfer switch including: a selector to select between a first AC power voltage and a second AC power voltage; an electromagnetic actuator responsive to a voltage level drop to make or break an electric circuit providing the AC electric power to the load through the transfer switch, the electromagnetic actuator including: a coil arrangement to provide a magnetic field in response to an electric current flowing therethrough, the coil arrangement being electrically coupled to the selector to provide an operating voltage across a first number of turns of the coil arrangement if the first AC power voltage is selected and a second number of turns of the coil arrangement if the second AC power voltage is selected, the first number of turns being different than the second number of turns; and an actuation member responsive to a change in the magnetic field caused by the voltage drop to change position and correspondingly change state of the transfer switch.

Optional features of this aspect may include: wherein the coil arrangement includes a coil with a first terminal and a second terminal, the coil defines the first number of turns between the first terminal and the second terminal, the coil includes a third terminal between the first terminal and the second terminal, the coil defines the second number of turns between the third terminal and the second terminal, the second number of turns are fewer than the first number of turns, and the second number of turns are included in the first number of turns; wherein the coil arrangement includes a first coil and a second coil independent of the first coil, the first coil defines the first number of turns, the second coil defines the second number of turns, and none of the first number of turns are included in the second number of turns; wherein the transfer switch includes a contactor, the coil arrangement and the actuation member of the electromagnetic actuator defines a solenoid device, and the solenoid device is structured to change condition of the contactor and correspondingly make or break the electric circuit to alter state of the transfer switch; wherein the selector includes an electrical switch, the electrical switch including: an input pole electrically coupled to the first contactor to receive an input representative of electricity from the first source, a first output electrically coupled to the first coil to place the operating voltage across the first coil if the switch is in a first state electrically connecting the input pole to the first output, and a second output electrically coupled to the second coil to place the operating voltage across the second coil if the switch is in a second state electrically connecting the input pole to the second output; wherein the transfer switch includes means for rectifying electricity provided to the coil arrangement; a first input interface operable to electrically connect to a public electric utility, the grid to serve as the first source; a second input interface operable to electrically connect the transfer switch to a backup power supply; an electric power generator connected to the second input interface; an internal combustion engine to drive the generator; wherein the transfer switch includes two or more other electromagnetic actuators, a first one of the other actuators including a third coil, a fourth coil, and a first other actuation member magnetically responsive to the third coil and the fourth coil; a second one of the other actuators including a fifth coil, a sixth coil, and a second other actuation member magnetically responsive to the fifth coil and the sixth coil; and wherein the selector is electrically connected to provide the first AC power voltage across the third coil and the fifth coil if the first AC power voltage is selected and to place the second AC power voltage across the fourth coil and the sixth if the second AC power voltage is selected.

Another aspect of the present application includes an apparatus, comprising: a transfer switch to transfer AC electric power provided to an electrical load from a first source to a second source and operable at two or more different voltage levels, the transfer switch including: an output to provide the AC electric power to the load; a first AC electrical power input to provide the AC electric power to the load from the first source; a second AC electrical power input to provide the AC electric power to the load from the second source; an electromagnetic switching arrangement responsive to a voltage change of the AC electric power to make or break an electric pathway between the output and at least one of the first input and the second input, the arrangement including: an actuation member structured to move in response to a change in the predefined magnetic field and correspondingly make or break the electric pathway; a first electric coil being structured to produce the predefined magnetic field if the AC electric power corresponds to a first one of the voltage levels, and a second electric coil being structured to produce the predefined magnetic field if the AC electric power corresponds to a second one of the voltage levels.

Optional features of the aspect may include: wherein the second coil is a portion of the first coil; a selector to select between the different voltage levels, the selector being electrically coupled to the first coil and the second coil to provide an operating voltage across the first coil if the first AC power voltage level is selected and the second coil if the second AC power voltage level is selected; wherein the first coil and the second coil are independent of one another, and neither one of the first coil and the second coil is included in an electrical circuit of another when the first one of the voltage levels or the second one of the voltage levels is selected; wherein the selector includes an electrical switch, the electrical switch including an input pole electrically coupled to the first input to receive a switch input representative of electricity from the first source, a first switch output electrically coupled to the first coil to place the operating voltage across the first coil if the switch is in a first state to electrically connect the input pole to the first switch output, and a second switch output electrically coupled to the second coil to place the operating voltage across the second coil if the switch is in a second state to electrically connect the input pole to the second switch output; wherein the transfer switch includes rectifier circuitry, the first one of the levels corresponds to 110 VAC, and a second one of the levels corresponds to 220 VAC; a public power grid connection to the first input, the grid to serve as the first source; an electric power generator connected to the second input; and an internal combustion engine to drive the generator; wherein the transfer switch includes: at least one other electromagnetic actuator comprising a third coil, a fourth coil, and one other actuation member magnetically responsive to the third coil and the fourth coil; and a selector to select among the different voltage levels, the selector being electrically coupled to provide an operating voltage levels across the first coil and third coil when the first one of the voltage levels is selected and across the second coil and the fourth coil when the second one of the voltage levels is selected.

Yet another aspect of the present application includes a method, comprising: providing a transfer switch to transfer AC electric power provided to an electrical load from a first AC power source to a second AC power source, the transfer switch including a switch actuator with a coil arrangement, the coil arrangement including a first coil, a second coil, and an actuation member, the first coil and the second coil each being positioned to induce a predefined magnetic field in the actuation member; determining a voltage level for the AC electric power; controlling movement of the switch actuation member with the first coil if the voltage level corresponds to a first level and with the second coil if the voltage level corresponds to a second level different than the first level; and in response to a change in position of the actuation member, changing between an electrically closed and an electrically open state of an electric circuit between the load and at least one of the first source and the second source.

Optional features of this aspect may include: rectifying electricity provided to the first coil and the second coil; providing the AC electric power from a public electric utility grid as the first source; switching from the first source to the second source in response to a deficiency in the electricity from the grid; after the switching from the first source, providing the AC electric power from a backup generator as the second source; starting an internal combustion engine to prepare for the switching from the first source; driving an electric power generator with the engine to serve as the second source; and generating the AC electric power with the generator driven by the engine; wherein the second coil is a portion of the first coil; wherein the first coil and the second coil are independent of one another, and neither one of the first coil and the second coil is included in an electrical circuit branch of another; wherein the coil arrangement includes a winding with a first terminal, a second terminal, and a third terminal; the first coil is defined between the first terminal and the second terminal, and the second coil is defined between the first terminal and the third terminal; controlling movement of a further switch actuation member with a third coil if the voltage level corresponds to a first level and with the fourth coil if the voltage level corresponds to a second level different than the first level; and in response to a change in position of the further actuation member, changing between an electrically closed and an electrically open state of an electric circuit between the load and at least one of the first source and the second source; providing the transfer switch with two or more other switch actuators, a first one of the other switch actuators including the third coil, the fourth coil, and the further actuation member; and a second one of the other switch actuators including a fifth coil, a sixth coil, and one other actuation member magnetically responsive to the fifth coil and the sixth coil; providing the transfer switch with a first contactor subject to the switch actuator and a second contactor subject to at least one of the other switch actuators; controlling movement of the one other switch actuation member with a fifth coil if the voltage level corresponds to a first level and with the sixth coil if the voltage level corresponds to a second level different than the first level; and in response to a change in position of the one other actuation member, changing between an electrically closed and an electrically open state of an electric circuit between the load and at least one of the first source and the second source; wherein the first level corresponds to 110 VAC and the second level corresponds to 220 VAC.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

The invention claimed is:

1. An apparatus, comprising:
   a transfer switch to transfer AC electric power provided to an electrical load from a first source to a second source, the transfer switch including:
   an output to provide the AC electric power to the load;
   a first contactor to selectively provide the AC electric power to the load from the first source;
   a second contactor to selectively provide the AC electric power to the load from the second source; and
   an electromagnetic contactor actuation arrangement including:
      a first electric coil;
      a second electric coil;
      a selector electrically coupled to the first coil and the second coil to provide an operating voltage across the first coil if a first AC power voltage level is selected and the second coil if a second AC power voltage level is selected; and
      a moveable contactor actuation member responsive to a magnetic field change to change a state of at least one of the first contactor or the second contactor between an open state and a closed state, the first coil generating the magnetic field change if the AC electric power provided to the load is at the first AC power voltage level, and the second coil generating the magnetic field change if the AC electric power provided to the load is at the second AC power voltage level.

2. The apparatus of claim 1, wherein the second coil includes several turns, and the first coil is a portion of the second coil being defined by a subset of the turns of the second coil.

3. The apparatus of claim 1, wherein the first coil includes a first number of turns, the second coil includes a second number of turns different than the first number of turns, and neither one of the first coil and the second coil is included in an electrical circuit of another when the first AC power voltage level or the second AC power voltage level is selected with the selector.

4. The apparatus of claim 1, wherein the contactor actuation arrangement includes a solenoid, the moveable contactor actuation member is an armature of the solenoid, and the first coil and the second coil are solenoid windings structured to induce approximately like magnetic fields when energized with a respective one of the first AC power voltage level and the second AC power voltage level.

5. The apparatus of claim 1, wherein the selector includes an electrical switch, the electrical switch including: an input pole electrically coupled to the first contactor to receive an input representative of electricity from the first source, a first output electrically coupled to the first coil to place the operating voltage across the first coil if the switch is in a first state electrically connecting the input pole to the first output, and a second output electrically coupled to the second coil to place the operating voltage across the second coil if the switch is in a second state electrically connecting the input pole to the second output.

6. The apparatus of claim 1, wherein the transfer switch includes rectifier circuitry electrically coupled to the contactor actuation arrangement.

7. The apparatus of claim 1, further comprising:
   a public electric utility grid input to the first contactor with the grid to serve as the first source;
   an electric power generator driven by an internal combustion engine to serve as the second source, the engine including a starter powered by a battery; and
   wherein the transfer switch includes battery charging circuitry to maintain charge of the battery, the transfer switch is structured to transfer a three phase form of the AC electric power, and the transfer switch further comprises:
   means for directing the engine to start if a transfer of the load from the grid to the generator is initiated,
   means for breaking electrical contact of the load with the grid before making electrical contact between the load and the generator,
   means for timing the electrical connection of the generator to the load to allow the engine to reach a desired speed, and,
   the first AC power voltage level corresponds to 110 VAC and the second AC power voltage level corresponds to 220 VAC.

8. The apparatus of claim 1, wherein the contactor actuation arrangement includes:
   a first electromagnetic actuator structured to change state of the first contactor, the first electromagnetic actuator including the moveable contactor actuation member, and the first coil and the second coil;
   a second electromagnetic actuator structured to change state of the second contactor, the second electromagnetic actuator includes a third coil and a fourth coil and another moveable actuation member magnetically responsive to the third coil and the fourth coil, and the selector is electrically connected to provide the first AC power voltage level across the third coil if the first AC power voltage level is selected and to place the second AC power voltage level across the fourth coil if the second AC power voltage level is selected.

9. The apparatus of claim 8, wherein the transfer switch includes a third contactor, the actuation arrangement includes a third electromagnetic actuator structured to change state of the third contactor, the third electromagnetic actuator includes a fifth coil, a sixth coil, and a further moveable actuator member magnetically responsive to the fifth coil and the sixth coil, and the selector is electrically connected to provide the first AC power voltage level across the fifth coil if the first AC power voltage level is selected and to place the second AC power voltage level across the sixth coil if the second AC power voltage level is selected.

10. An apparatus, comprising:
    a transfer switch to transfer AC electric power provided to an electrical load from a first AC power source to a second AC power source, the transfer switch including:

a selector to select between a first AC power voltage and a second AC power voltage; and an electromagnetic actuator responsive to a voltage level drop to make or break an electric circuit providing the AC electric power to the load through the transfer switch, the electromagnetic actuator including:

a coil arrangement to provide a magnetic field in response to an electric current flowing therethrough, the coil arrangement being electrically coupled to the selector to provide an operating voltage across a first number of turns of the coil arrangement if the first AC power voltage is selected and a second number of turns of the coil arrangement if the second AC power voltage is selected, the first number of turns being different than the second number of turns; and an actuation member responsive to a change in the magnetic field caused by the voltage drop to change position and correspondingly change state of the transfer switch.

11. The apparatus of claim 10, wherein the coil arrangement includes a coil with a first terminal and a second terminal, the coil defines the first number of turns between the first terminal and the second terminal, the coil includes a third terminal between the first terminal and the second terminal, the coil defines the second number of turns between the third terminal and the second terminal, the second number of turns are fewer than the first number of turns, and the second number of turns are included in the first number of turns.

12. The apparatus of claim 10, wherein the coil arrangement includes a first coil and a second coil independent of the first coil, the first coil defines the first number of turns, the second coil defines the second number of turns, and none of the first number of turns are included in the second number of turns.

13. The apparatus of claim 10, wherein the transfer switch includes a contactor, the coil arrangement and the actuation member of the electromagnetic actuator defines a solenoid device, and the solenoid device is structured to change condition of the contactor and correspondingly make or break the electric circuit to alter state of the transfer switch.

14. The apparatus of claim 10, wherein the selector includes an electrical switch, the electrical switch including: an input pole electrically coupled to the first contactor to receive an input representative of electricity from the first source, a first output electrically coupled to the first coil to place the operating voltage across the first coil if the switch is in a first state electrically connecting the input pole to the first output, and a second output electrically coupled to the second coil to place the operating voltage across the second coil if the switch is in a second state electrically connecting the input pole to the second output.

15. The apparatus of claim 10, wherein the transfer switch includes means for rectifying electricity provided to the coil arrangement.

16. The apparatus of claim 10, further comprising:

a first input interface operable to electrically connect to a public electric utility, the grid to serve as the first source;

a second input interface operable to electrically connect the transfer switch to a backup power supply;

an electric power generator connected to the second input interface;

an internal combustion engine to drive the generator.

17. The apparatus of claim 10, wherein the transfer switch includes two or more other electromagnetic actuators, a first one of the other actuators including a third coil, a fourth coil, and a first other actuation member magnetically responsive to the third coil and the fourth coil;

a second one of the other actuators including a fifth coil, a sixth coil, and a second other actuation member magnetically responsive to the fifth coil and the sixth coil; and wherein the selector is electrically connected to provide the first AC power voltage across the third coil and the fifth coil if the first AC power voltage is selected and to place the second AC power voltage across the fourth coil and the sixth if the second AC power voltage is selected.

18. An apparatus, comprising:

a transfer switch to transfer AC electric power provided to an electrical load from a first source to a second source and operable at two or more different voltage levels, the transfer switch including:

an output to provide the AC electric power to the load;

a first AC electrical power input to provide the AC electric power to the load from the first source;

a second AC electrical power input to provide the AC electric power to the load from the second source; and an electromagnetic switching arrangement responsive to a voltage change of the AC electric power to make or break an electric pathway between the output and at least one of the first input and the second input, the arrangement including:

an actuation member structured to move in response to a change in the predefined magnetic field and correspondingly make or break the electric pathway;

a first electric coil being structured to produce the predefined magnetic field if the AC electric power corresponds to a first one of the voltage levels, and a second electric coil being structured to produce the predefined magnetic field if the AC electric power corresponds to a second one of the voltage levels.

19. The apparatus of claim 18, wherein the second coil is a portion of the first coil.

20. The apparatus of claim 18, further comprising a selector to select between the different voltage levels, the selector being electrically coupled to the first coil and the second coil to provide an operating voltage across the first coil if the first AC power voltage level is selected and the second coil if the second AC power voltage level is selected.

21. The apparatus of claim 20, wherein the first coil and the second coil are independent of one another, and neither one of the first coil and the second coil is included in an electrical circuit of another when the first one of the voltage levels or the second one of the voltage levels is selected.

22. The apparatus of claim 20, wherein the selector includes an electrical switch, the electrical switch including an input pole electrically coupled to the first input to receive a switch input representative of electricity from the first source, a first switch output electrically coupled to the first coil to place the operating voltage across the first coil if the switch is in a first state to electrically connect the input pole to the first switch output, and a second switch output electrically coupled to the second coil to place the operating voltage across the second coil if the switch is in a second state to electrically connect the input pole to the second switch output.

23. The apparatus of claim 18, wherein the transfer switch includes rectifier circuitry, the first one of the levels corresponds to 110 VAC, and a second one of the levels corresponds to 220 VAC.

24. The apparatus of claim 18, further comprising:
a public power grid connection to the first input, the grid to serve as the first source;
an electric power generator connected to the second input; and
an internal combustion engine to drive the generator.

25. The apparatus of claim 18, wherein the transfer switch includes:
at least one other electromagnetic actuator comprising a third coil, a fourth coil, and one other actuation member magnetically responsive to the third coil and the fourth coil; and
a selector to select among the different voltage levels, the selector being electrically coupled to provide an operating voltage levels across the first coil and third coil when the first one of the voltage levels is selected and across the second coil and the fourth coil when the second one of the voltage levels is selected.

26. A method, comprising:
providing a transfer switch to transfer AC electric power provided to an electrical load from a first AC power source to a second AC power source, the transfer switch including a switch actuator with a coil arrangement, the coil arrangement including a first coil, a second coil, and an actuation member, the first coil and the second coil each being positioned to induce a predefined magnetic field in the actuation member;
determining a voltage level for the AC electric power;
controlling movement of the switch actuation member with the first coil if the voltage level corresponds to a first voltage level and with the second coil if the voltage level corresponds to a second voltage level different than the first voltage level; and
in response to a change in position of the actuation member, changing between an electrically closed and an electrically open state of an electric circuit between the load and at least one of the first source and the second source.

27. The method of claim 26, which includes rectifying electricity provided to the first coil and the second coil.

28. The method of claim 26, which includes:
providing the AC electric power from a public electric utility grid as the first source;
switching from the first source to the second source in response to a deficiency in the electricity from the grid;
after the switching from the first source, providing the AC electric power from a backup generator as the second source.

29. The method of claim 28, which includes:
starting an internal combustion engine to prepare for the switching from the first source;
driving an electric power generator with the engine to serve as the second source; and
generating the AC electric power with the generator driven by the engine.

30. The method of claim 26, wherein the second coil is a portion of the first coil.

31. The method of claim 26, wherein the first coil and the second coil are independent of one another, and neither one of the first coil and the second coil is included in an electrical circuit branch of another.

32. The method of claim 26, wherein the coil arrangement includes a winding with a first terminal, a second terminal, and a third terminal; the first coil is defined between the first terminal and the second terminal, and the second coil is defined between the first terminal and the third terminal.

33. The method of claim 26, which includes:
controlling movement of a further switch actuation member with a third coil if the voltage level corresponds to a first voltage level and with the fourth coil if the voltage level corresponds to a second voltage level different than the first voltage level; and
in response to a change in position of the further actuation member, changing between an electrically closed and an electrically open state of an electric circuit between the load and at least one of the first source and the second source.

34. The method of claim 33, which includes:
providing the transfer switch with two or more other switch actuators, a first one of the other switch actuators including the third coil, the fourth coil, and the further actuation member;
and a second one of the other switch actuators including a fifth coil, a sixth coil, and one other actuation member magnetically responsive to the fifth coil and the sixth coil;
providing the transfer switch with a first contactor subject to the switch actuator and a second contactor subject to at least one of the other switch actuators;
controlling movement of the one other switch actuation member with a fifth coil if the voltage level corresponds to a first voltage level and with the sixth coil if the voltage level corresponds to a second voltage level different than the first voltage level; and
in response to a change in position of the one other actuation member, changing between an electrically closed and an electrically open state of an electric circuit between the load and at least one of the first source and the second source.

35. The method of claim 26, wherein the first voltage level corresponds to 110VAC and the second voltage level corresponds to 220 VAC.

\* \* \* \* \*